United States Patent [19]
Chamberlin

[11] 3,918,180
[45] Nov. 11, 1975

[54] PUPPET BOOK STRUCTURE
[76] Inventor: Robert W. Chamberlin, 3051 N.E. 92nd, Seattle, Wash. 98115
[22] Filed: Oct. 11, 1973
[21] Appl. No.: 405,265

[52] U.S. Cl. .................. 35/35 E; 46/116; 46/154
[51] Int. Cl.² ........................................ G09B 17/00
[58] Field of Search............ 35/35 E; 46/13, 34, 115, 46/116, 126, 145, 154; 281/42

[56] References Cited
UNITED STATES PATENTS

| | | | |
|---|---|---|---|
| 1,139,643 | 5/1915 | Cross | 46/34 |
| 1,551,231 | 8/1925 | Aronson | 46/115 |
| 2,187,407 | 1/1940 | Stone | 46/13 |
| 2,548,043 | 4/1951 | Muhlhauser | 35/35 E X |
| 2,621,440 | 12/1952 | Stone | 46/13 |
| 2,725,670 | 12/1955 | Hodes | 46/116 |
| 3,698,127 | 10/1972 | Harp | 46/126 |
| 3,742,644 | 7/1973 | Williams | 46/126 |

OTHER PUBLICATIONS

*Funny Fingers* by Kent Salisbury, published by Western Publishing Co., Inc. 1971.

*Primary Examiner*—Wm. H. Grieb
*Attorney, Agent, or Firm*—Graybeal, Barnard, Uhlir & Hughes

[57] ABSTRACT

A combination book and puppet structure comprising a book having apertures in the cover and all of the pages thereof at like locations thereon and one or more puppets sized to extend through the apertures into the book so that as each page of the book is turned the puppets appear on the page being read and may be manipulated from without the book in conjunction with the material portrayed on the pages of the book.

11 Claims, 12 Drawing Figures

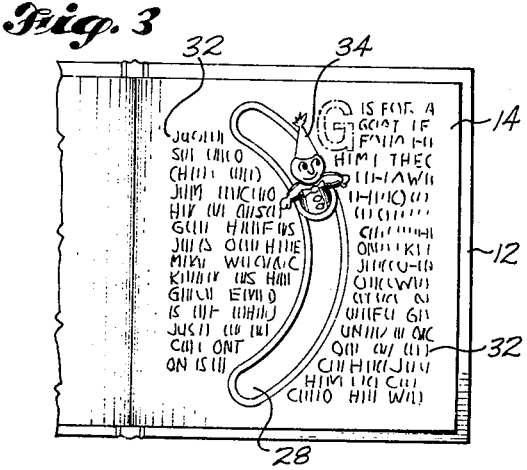
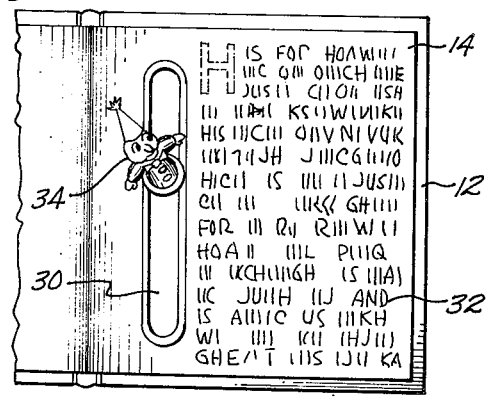
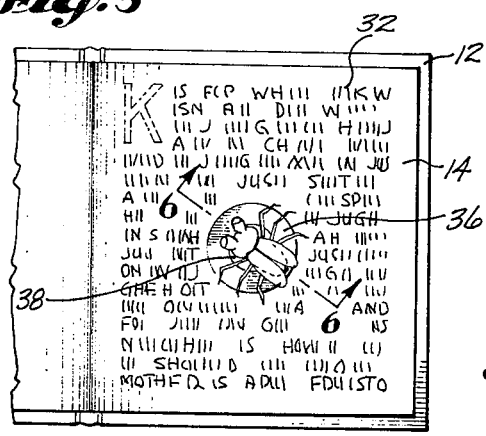
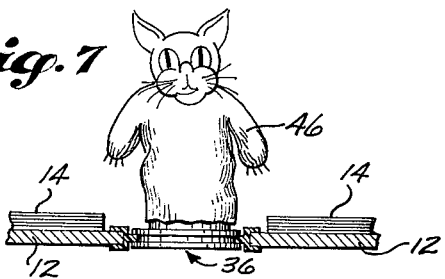
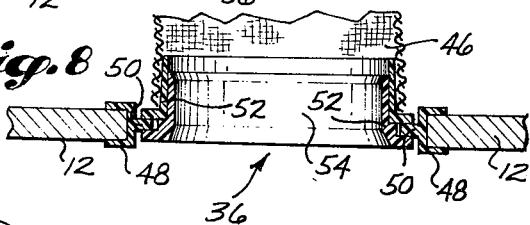
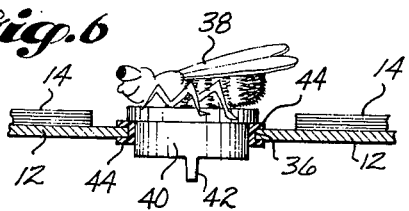
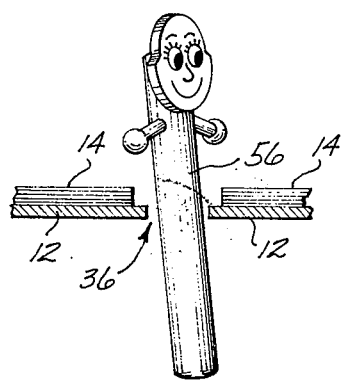
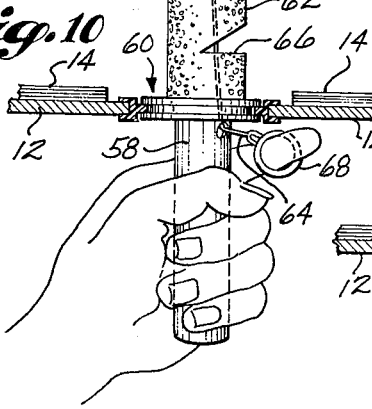
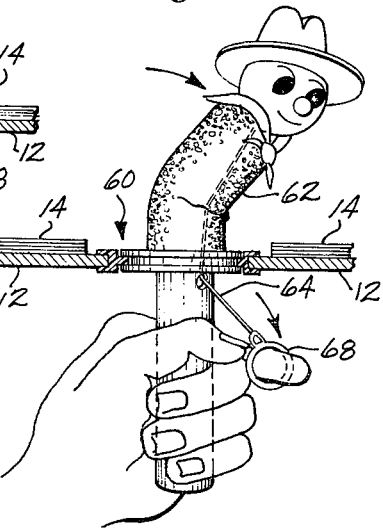

PUPPET BOOK STRUCTURE

BACKGROUND OF THE INVENTION

1. Field of the Invention

This invention relates, in general, to an educational or amusement device, and in particular, to a book and puppet combination particularly suited for use with children.

2. Description of the Prior Art

Puppets and puppet shows have, of course, long been known and the effectiveness of the use of puppets to capture the attention and imagination of children has long been recognized. Children's books of the conventional form have, of course, also long been known although the difficulty of maintaining the interest of a very young child for an extended period while the conventional form of book is being read to the child is generally recognized. Indeed, the difficulty of interesting a child who has learned to read in reading books, particularly with the television competing for the child's time, is also great.

Puppet shows are normally performed in puppet theaters or on puppet stages of appropriate size, and two forms of finger puppetry are disclosed in U.S. Pat. Nos. 2,187,407 and 2,621,440. Animated books are also known, such as that disclosed in U.S. Pat. No. 1,139,643 wherein various animal figures or the like are folded between the pages of a book to automatically unfold when the pages of the book are turned. Additionally, books in which the fingers of the reader are inserted through holes in the pages thereof to portray anatomical portions of persons or animals pictured on the pages of the book are also known, such as the book *FUNNY FINGERS* by Kent Salisbury published by Western Publishing Co., Inc.

BRIEF SUMMARY OF THE INVENTION

This invention recognizes the tendency of children to anthropomorphize puppets and the consequent effectiveness of the use of puppetry to gain and maintain the attention of a child for extended periods to allow the child to be educated or entertained.

In general, the disclosed invention relates to books, and particularly to children's books of a conventional form including a cover and a plurality of pages bound within the cover, but additionally including apertures both in the cover and in each of the pages bound therebetween. In one embodiment, a single aperture is positioned in the cover and in each page of the book at substantially the same location such that a three dimensional void is formed within the book. A puppet sized to slip through the apertures in each of the pages of the book as the pages of the book are turned, is inserted into the three dimensional void from without the book through the aperture in the cover and through the respective apertures in the pages of the book overlying the cover.

The aperture may extend rectilinearly or curvilinearly through the cover and pages of the book thereby allowing the puppet extending therethrough to be moved across the pages of the book. Printed matter may be arranged on some or all of the pages of the book with respect to the aperture thereon such that the puppet may be moved adjacent the printed matter as it is read. In other embodiments a plurality of apertures of varying size and shape may be provided in the cover and pages of the book having one or more puppets movable therein.

It is an object of the present invention, therefore, to provide a children's book including a puppet movable in overlying apertures in each of the pages of the book.

Another object of the present invention is to provide a book wherein each of the pages includes a rectilinear or curvilinear aperture therein such that the puppet may be moved across the pages of the book.

One more object is to provide a puppet book wherein the location of the aperture in each of the pages of the book is spacially related to printed matter on such page.

Still another object of the instant invention is to provide a puppet book including a relatively rigid cover on which the puppet is mounted.

A broader object is to provide a book and puppet combination wherein the book includes overlying apertures in each of the pages thereof and one or more puppets extend therethrough such that the pages of the book function as a stage for the puppets.

An additional object is to provide a book including a puppet extending through apertures in the cover and each of the pages thereof adapted to be manipulated from without the book such that the movement of the puppet may be used to capture and maintain the attention of a young child being read to.

One more object is to provide a puppet and book combination wherein a plurality of puppets of differing color are color coordinated with portions of the printed matter on the pages.

Other and additional advantages will be apparent from the following description taken in conjunction with the accompanying drawings.

BRIEF DESCRIPTION OF THE DRAWINGS

FIG. 3 is a plan view of a typical page of a puppet book made according to the instant invention including a curvilinear aperture.

FIG. 4 is a plan view of a typical page of a puppet book made according to the instant invention including a rectilinear aperture.

FIG. 5 is a plan view of a page of another typical embodiment of a puppet book wherein the puppet device is shown mounted for rotation in an aperture.

FIG. 6 is a sectional view taken along line 6—6 in FIG. 5.

FIG. 7 is a sectional elevation view of a typical puppet and mounting means made according to the instant invention.

FIG. 8 is an enlarged partial sectional elevation view showing one mode of mounting a puppet on the cover aperture of a book.

FIG. 9 is a sectional elevation view of one typical embodiment of the present invention showing a stick puppet extending through a three dimensional void within the book.

FIG. 10 is a sectional elevation view of another typical embodiment of the instant invention including a cord manipulated flexible puppet in the upright position.

FIG. 11 is a view similar to FIG. 10 showing the puppet bent in response to movement of the actuating cord.

DETAILED DESCRIPTION OF THE INVENTION

Figure 1:
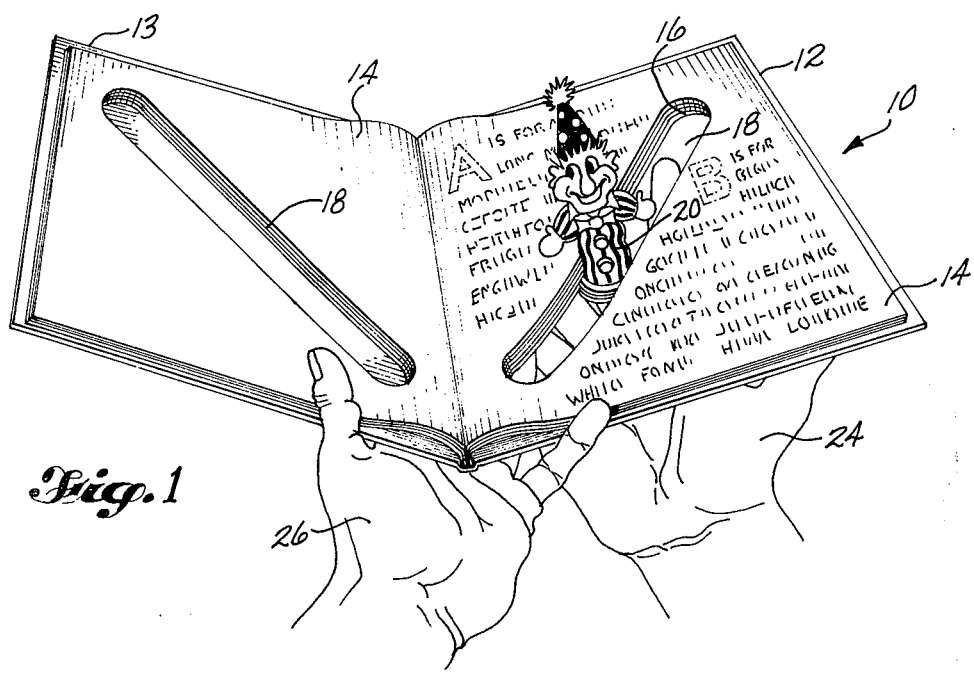
FIG. 1 is a perspective view of one typical form of puppet book constructed according to the present invention.
Figure 2:
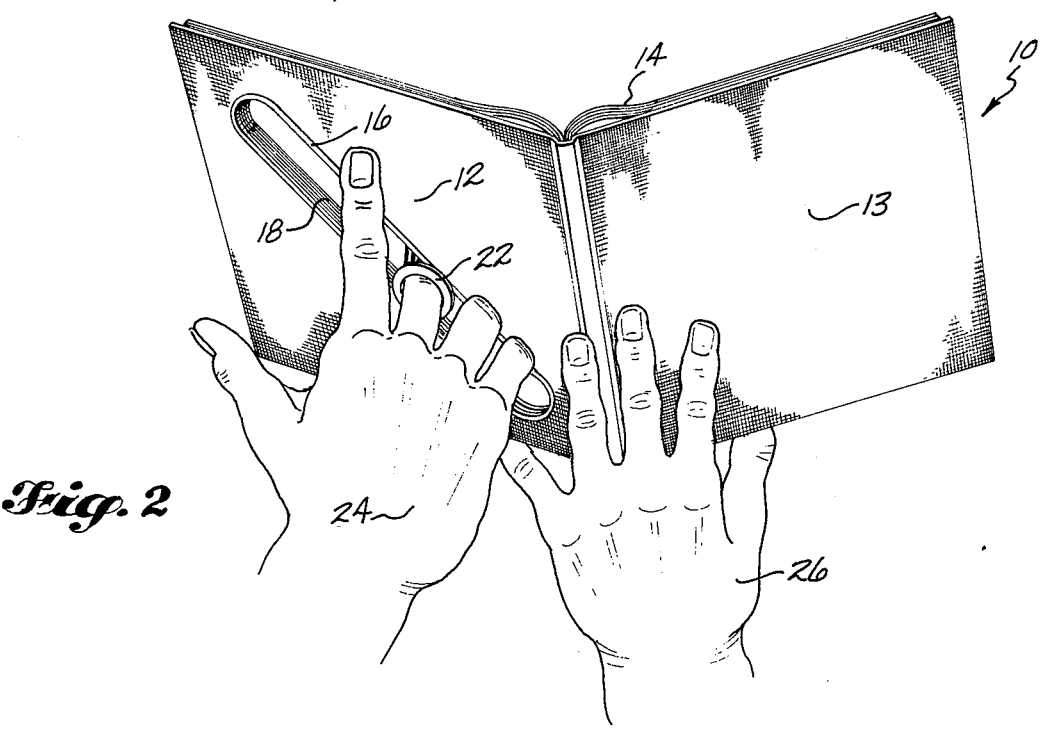
FIG. 2 is a rear perspective view of the puppet book of FIG. 1.

Referring initially to FIGS. 1 and 2, a puppet book 10 made according to the instant invention is disclosed comprising a book having cover portions 12 and 13, a plurality of pages 14 bound along one edge therebetween, an aperture 16 in the cover 12 and apertures 18 in each of the pages 14. A puppet 20 having a base means 22 mounting the puppet on the edges of cover aperture 16 is positioned to extend upwardly through the three dimensional void formed in the apertures in the cover and pages of the book and be manipulated from without the book.

As illustrated, apertures 16 and 18 extend diagonally across cover portion 12 and pages 14 such that the puppet 20 can be moved substantially completely from one corner of a page of the book to the opposite corner thereof by movement of hand 24. Hand 26 is shown to provide primary support for the book while hand 24 is employed to manipulate the puppet 20, but it will be understood that in alternate embodiments either or both of the reader's hands may be used to manipulate puppets or support the book depending upon the particular number, location and configuration of the apertures provided in the cover and pages of the book. For example, a second diagonal aperture may be provided to extend through cover portion 13 and a puppet positioned therein for manipulation by the fingers of hand 26. Alternatively, a circular aperture may be provided on either cover portion such as that described hereafter with respect to FIG. 5 having a human or animal puppet or doll positioned therein for rotational movement. As will be understood puppets of this type may not require continual hand manipulation in order to be maintained in an erect position. In other embodiments where a child and an adult jointly "read" the book, the child may manipulate the puppets while the adult supports the book. The term read is used herein in its broadest sense to cover situations where the child is too young to actually read but can look at pictures on the pages of the book and manipulate the puppets as well as situations where there may not be any printed words as such on the pages of the book, or situations where portions of the story printed on the pages of the book are left unprinted to allow the child to participate in use of the puppet book by imaginatively completing or resolving the story or situation partially illustrated. In the latter mode this invention is not restrictive in the sense a typical book is in that each reading may vary according to the mood and recent experiences of the child as well as in view of the accrued subtleties arising from previous "readings" of the puppet book.

In still another embodiment, a rectilinear or curvilinear aperture as well as one or more circular apertures may be provided in either cover portions 12 or 13 and in the overlying pages 14 to allow a plurality of puppets to be moved or displayed on a single page.

Referring now to FIGS. 3 and 4, cover portions 12 having a plurality of pages 14 overlaid thereon are disclosed including curvilinear apertures 28 and rectilinear apertures 30 respectively in both the cover and pages. Printed matter or illustrations are shown in FIG. 3 to be represented schematically by blocks 32 arranged on the opposed sides of apertures 28 such that the clown puppet 34 may be moved laterally adjacent the particular printed matter being read at a given time. In this manner the attention of a child being read to may be drawn to particular words or illustrations on the page by manipulation of the puppet. The puppet 34 may be provided with a wand, baton, or pointer to allow specific matter on the page to be pointed out with even greater particularity.

FIG. 4 discloses a variant page design but it will be understood that the manipulation of the puppet 34 may be carried out to accomplish the attention directing purpose described above with reference to FIG. 3. Other page layouts and aperture configurations such as an "X" or letters of the alphabet or the like may also be employed, and it is understood that this invention is not intended to be limited to a particular page layout and aperture configuration.

Figure 12:
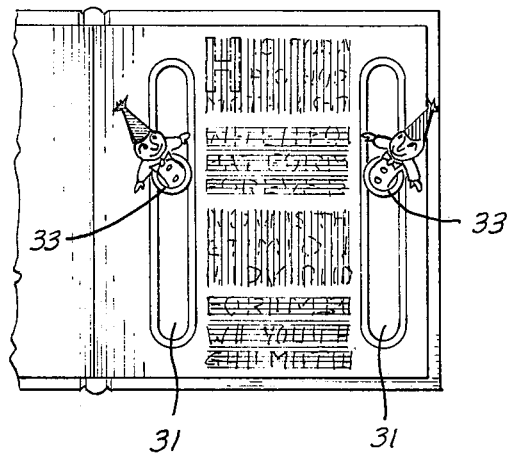
FIG. 12 is a plan view of a typical page of a puppet book made according to the instant invention including a pair of puppet means extending through a pair of apertures in said book, the puppets being lined respectively for the colors red and blue and printed matter on said page also lined for the colors red and blue.

Referring to FIG. 12, a book structure with pages having printed matter thereon is disclosed. Two three dimensional voids 31 are provided on said page each void including a puppet 33 extending therethrough. The puppet extending through lefthand void 31 in FIG. 12 is associated with a particular color, in the illustrated embodiment blue, while the puppet in the righthand three dimensional void in FIG. 12 is associated with a different color in this case red. Printed matter associated by color with each of the red and blue puppets is also shown positioned on the page.

Referring now to FIG. 5, a single circular aperture 36 is shown substantially centered on cover 12 including a model of a bee 38 mounted for rotation therein. Referring additionally to FIG. 6, the mounting of bee 38 in aperture 36 is shown to be accomplished by fixedly mounting the bee model on the top surface of a plug 40 having a finger grip portion 42 on the bottom thereof and including a channel member 44 surrounding the circular plug 40 and having a U-shaped cross section sized to grip the edges of aperture 36 in the book cover portion 12. In one embodiment, the book cover portion 12 may be made of relatively thick cardboard, while the channel member 44 may be formed of plastic or other suitable material which allows the plug to be rotated in aperture 36 without undue friction by manipulation of finger grip portion 42.

Referring to FIGS. 7 and 8, another form of mounting structure for a puppet such as a cloth bodied cat puppet 46 is disclosed comprising portions 48 mounted on the edge of aperture 36 such that the tongues 50 extend inwardly into grooves formed in cooperating members 52. The members 52 may be formed as a portion of or mounted upon circular puppet base member 54 to which the cloth body portion 46 is affixed by means of glue or the like. It will be understood that alternatively the cloth body portion 46 may be glued directly to the cover portion 12 with a consequent reduction in mobility of the puppet. The tongue and groove members 48 and 52 may be formed of plastic, and the portions 48 may be resiliently clamped on the edge of the aperture in cover 12 or glued thereto. It will be understood that mountings similar to those disclosed in both FIGS. 6 and 8 may also be used to mount puppets in the curvilinear or rectilinear apertures disclosed, for example, in FIGS. 3 and 4, by running tongue portions

48 along the edges of the respective cover apertures.

Although not illustrated, it is also contemplated that the puppet may be mounted on cover portion 12 by providing grooves directly in the base member 54 of the puppet sized to cooperate directly with the edges of the cover aperture.

Referring now to FIG. 9, one form of stick puppet 56 is shown extending through the three dimensional void in the book formed by the apertures in the cover and overlying pages. Stick puppet 56 is sized to be moved into or out of the void in the book to allow other puppets decorated to represent different characters to be substituted therefor, possibly in keeping with the story told in the printed matter on the pages 14.

FIGS. 10 and 11 disclose still another form of puppet mounted in the aperture in cover portion 12 to extend upwardly through the void formed by the apertures in overlying pages 14 including a rigid hand grip portion 58, a tongue and groove mounting structure 60, and a flexible upper body portion 62 which may be moved in response to the extension of string 64. The tongue and groove mounting structure 60 is shown to be of a type similar to that described heretofore with reference to FIG. 8, but it will be understood that any other suitable form of mounting structure may be substituted therefor. Upper body portion 62 is formed of foam rubber or the like and includes a notch 66 which imparts a particular bending movement to the puppet when string 64 attached to the head of the puppet is pulled downwardly. String 64 may be provided with a ring 68 into which a finger of the puppet operator may be inserted. It will be understood that in the completed form foam rubber portion 62 would be covered with a cloth costume or the like so that notch 66 would be hidden from view.

In summary it will be understood that depending upon the content of the book the pages of the book may either be employed as a stage on which the puppet is moved, or the puppet may be used to point out or accentuate portions of the printed matter on the pages of the book. It is contemplated that in one form of this invention, a plurality of apertures may be provided in the cover portion 12 of the book while apertures may be formed in less than all of the overlying pages of the book. For example, in a book having 20 pages and two circular apertures in cover portion 12, all 20 pages may have a circular aperture positioned to form a three dimensional puppet receiving void with one cover aperture while only the last 10 pages of the book has apertures corresponding to both cover apertures. This construction allows a single puppet character to be employed during the reading of the first 10 pages of the book while a second puppet character may be introduced after 10 pages and both puppets employed in conjunction with the reading of the last 10 pages of the book. Obvious variations on the above are considered to be within the scope of the instant invention.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A book structure comprising:

a plurality of pages bound together along one edge and a cover for said plurality of pages;

an aperture in each of said pages and in said cover, said page apertures positioned at substantially the same location on each page and said cover aperture aligned with said page apertures to define a three dimensional void;

puppet means mounted on said cover adjacent said aperture therein and extendible inwardly through said page apertures, said puppet means being sized to pass through the aperture in each of said pages as said pages are turned; and manipulation means extending through said cover and page apertures and providing animative manipulation of said puppet means with respect to the pages of said book with such manipulation being applied from the outside face of said book cover while the book is open to any selected page.

2. The book structure of claim 1 wherein said puppet means is a finger puppet and wherein said manipulation means is the finger of a person using said book.

3. The book structure of claim 1 wherein at least some of said pages include printed matter thereon, and wherein said apertures in said pages are positioned adjacent said printed matter whereby said manipulation means manipulates said puppet means with respect thereto.

4. The book structure of claim 3 including a plurality of apertures spaced on said pages to define a plurality of three dimensional voids, each of said voids including puppet means extending therethrough, each of said puppet means being associated with different colors, said puppets being related to printed matter of like associated color on said pages.

5. The book structure of claim 1 wherein said puppet means comprises a stick puppet including a puppet portion and a manipulation means portion, said manipulation means portion extending outwardly from said three dimensional void in said book and adapted to be gripped and moved, said puppet portion extending into said three dimensional void through the apertures in each of said pages of said book and adapted to be manipulated in response to movement of said manipulation means.

6. The book structure of claim 1 including mounting means for mounting a puppet on the cover of said book comprising:

a first portion of said mounting means clamped on the edges of said aperture in said cover and a second portion of said mounting means encircling said puppet means a distance below its top;

said first and second mounting means shaped to cooperatingly engage each other to mount said puppet on said cover.

7. The book structure of claim 1 wherein said puppet means includes a mounting structure positioned thereon a distance below the top of said puppet means, said mounting structure including upper and lower lip portions adapted to grip the upper and lower edges of said aperture in said cover to mount said puppet thereon.

8. In a book structure of the type including a front cover portion, a rear cover portion and a plurality of pages bound therebetween, the improvement comprising:

an aperture in at least one of said cover portions and an aperture in each of said pages, said apertures being positioned in like locations on said cover portion and said pages such that when said cover portion and said pages are in overlying relation with respect to each other a three dimensional void is formed within said book structure;

puppet means extending inwardly through said aperture in said cover portion and through the apertures in said pages overlying said cover portion; and manipulation means extending through said cover and page apertures and providing animative manipulation of said puppet means with respect to the pages of said book with such manipulation being applied from the outside face of said book cover while the book is open to any selected page.

9. The book structure of claim 8 wherein said apertures extend longitudinally on said cover portion and said pages to define a longitudinally extending three dimensional void in said book, said pupper means being movable in said longitudinal void, and wherein at least some of said pages include printed matter thereon, said apertures being positioned with respect to said printed matter to allow said puppet means to be moved and manipulated adjacent said printed matter.

10. The book structure of claim 8 including a first puppet mounting means on the edge of said cover aperture and a second puppet mounting means adjacent the bottom portion of said puppet means, said first and second puppet mounting means being shaped to cooperatingly engage each other to movably mount said puppet means in said cover aperture such that said puppet means extends inwardly into said three dimentional void in said book structure.

11. The book structure of claim 8 wherein said puppet means includes a flexible puppet body within said three dimensional void mounted on a rigid support rod extending without said three dimensional void through said cover aperture, cord means extending from said body to a point adjacent said rigid support rod to allow said puppet body to be flexed in response to manipulation of said cord from without said book.

* * * * *